United States Patent
Long

(10) Patent No.: US 9,601,807 B2
(45) Date of Patent: Mar. 21, 2017

(54) ELECTROLYTE SOLUTION AND LITHIUM ION BATTERY USING SAID ELECTROLYTE SOLUTION

(71) Applicants: Dongguan Amperex Technology Limited, Dongguan, Guangdong Province (CN); Ningde Amperex Technology Limited, Ningde, Fujian Province (CN)

(72) Inventor: Bing Long, Ningde (CN)

(73) Assignees: DONGGUAN AMPEREX TECHNOLOGY LIMITED, Dongguan (CN); NINGDE AMPEREX TECHNOLOGY LIMITIED, Ningde (CN)

( * ) Notice: Subject to any disclaimer, the term of this patent is extended or adjusted under 35 U.S.C. 154(b) by 0 days.

(21) Appl. No.: 14/825,104

(22) Filed: Aug. 12, 2015

(65) Prior Publication Data

US 2016/0181659 A1    Jun. 23, 2016

(30) Foreign Application Priority Data

Dec. 17, 2014    (CN) .......................... 2014 1 0788397

(51) Int. Cl.

| | | |
|---|---|---|
| *H01M 10/0567* | (2010.01) | |
| *H01M 10/0525* | (2010.01) | |
| *H01M 10/0569* | (2010.01) | |
| *H01M 10/42* | (2006.01) | |

(52) U.S. Cl.
CPC ... *H01M 10/0567* (2013.01); *H01M 10/0525* (2013.01); *H01M 10/4235* (2013.01); *H01M 2300/0025* (2013.01)

(58) Field of Classification Search
CPC ......... H01M 10/0525; H01M 10/0567; H01M 10/0569; H01M 2300/0025; H01M 2300/0037; H01M 2220/30; Y02E 60/122
See application file for complete search history.

(56) References Cited

U.S. PATENT DOCUMENTS

| | | | |
|---|---|---|---|
| 6,879,482 B2 | 4/2005 | Kawasato et al. | |
| 2008/0057402 A1 | 3/2008 | Abe et al. | |
| 2015/0125761 A1* | 5/2015 | Shimamoto | H01M 10/0525 429/338 |
| 2015/0140395 A1* | 5/2015 | Kim | H01M 10/0567 429/126 |

* cited by examiner

Primary Examiner — Brittany Raymond
(74) Attorney, Agent, or Firm — Arent Fox LLP

(57) ABSTRACT

An electrolyte solution for a lithium-ion battery and a lithium-ion battery using the electrolyte solution are provided. The electrolyte solution includes organic solvents, an electrolyte lithium salt, and additives. The additives include succinonitrile, fluorobenzene, and lithium tetrafluoroborate. The percentage by mass of the fluorobenzene in the electrolyte solution is 0.1%-15%. The percentage by mass of the succinonitrile in the electrolyte solution is 0.1%-10%. The percentage by mass of the lithium tetrafluoroborate in the electrolyte solution is 0.01%-1%. The electrolyte solution may increase the charging voltage upper limit and improve the high-temperature intermittent cyclability of the lithium-ion battery. At the same time, the electrolyte may lower the battery swelling rate, reduce the internal resistance, and improve the stability and safety of the lithium-ion battery.

10 Claims, 5 Drawing Sheets

TABLE 1

| Electrolyte Solution No. | Percentage by mass of each additive in electrolyte solutions (%) | | | |
|---|---|---|---|---|
| | FB (%) | SN (%) | LiBF$_4$ (%) | FEC (%) |
| DL1$^a$ | 0 | 0 | 0 | 5 |
| DL2$^a$ | 0 | 0 | 0.3 | 5 |
| DL3$^a$ | 0 | 3 | 0.3 | 5 |
| DL4$^a$ | 7 | 0 | 0.3 | 5 |
| DL5$^a$ | 7 | 3 | 0 | 5 |
| L1$^a$ | 7 | 3 | 0.3 | 5 |
| L2$^a$ | 0.1 | 3 | 0.3 | 5 |
| L3$^a$ | 3 | 3 | 0.3 | 5 |
| L4$^a$ | 10 | 3 | 0.3 | 5 |
| L5$^a$ | 15 | 3 | 0.3 | 5 |
| L6$^a$ | 7 | 0.1 | 0.3 | 5 |
| L7$^a$ | 7 | 0.5 | 0.3 | 5 |
| L8$^a$ | 7 | 10 | 0.3 | 5 |
| L9$^a$ | 7 | 3 | 0.01 | 5 |
| L10$^a$ | 7 | 3 | 0.1 | 5 |
| L11$^a$ | 7 | 3 | 0.5 | 5 |
| L12$^a$ | 7 | 3 | 0.3 | 0.1 |
| L13$^a$ | 7 | 3 | 0.3 | 10 |

TABLE 1

| Electrolyte Solution No. | Percentage by mass of each additive in electrolyte solutions (%) | | | |
|---|---|---|---|---|
| | FB (%) | SN (%) | $LiBF_4$ (%) | FEC (%) |
| DL1[#] | 0 | 0 | 0 | 5 |
| DL2[#] | 0 | 0 | 0.3 | 5 |
| DL3[#] | 0 | 3 | 0.3 | 5 |
| DL4[#] | 7 | 0 | 0.3 | 5 |
| DL5[#] | 7 | 3 | 0 | 5 |
| L1[#] | 7 | 3 | 0.3 | 5 |
| L2[#] | 0.1 | 3 | 0.3 | 5 |
| L3[#] | 3 | 3 | 0.3 | 5 |
| L4[#] | 10 | 3 | 0.3 | 5 |
| L5[#] | 15 | 3 | 0.3 | 5 |
| L6[#] | 7 | 0.1 | 0.3 | 5 |
| L7[#] | 7 | 0.5 | 0.3 | 5 |
| L8[#] | 7 | 10 | 0.3 | 5 |
| L9[#] | 7 | 3 | 0.01 | 5 |
| L10[#] | 7 | 3 | 0.1 | 5 |
| L11[#] | 7 | 3 | 0.5 | 5 |
| L12[#] | 7 | 3 | 0.3 | 0.1 |
| L13[#] | 7 | 3 | 0.3 | 10 |

FIG. 1

TABLE 2

| Battery No. | Rate of thickness increase (%) | | Rate of internal resistance increase (%) | | Capacity retention ratio (%) | Capacity recovery ratio (%) |
|---|---|---|---|---|---|---|
| | 20 days | 35 days | 20 days | 35 days | 20 days | 35 days |
| DC1# | 24.95 | 44.72 | 29.15 | 36.98 | 77.67 | 76.15 |
| DC2# | 23.15 | 44.55 | 27.64 | 35.83 | 77.25 | 76.62 |
| DC3# | 19.63 | 38.78 | 25.51 | 34.64 | 78.77 | 71.06 |
| DC4# | 19.11 | 37.35 | 24.63 | 33.32 | 78.91 | 72.05 |
| DC5# | 12.91 | 33.89 | 23.14 | 38.56 | 82.23 | 75.34 |
| C1# | 2.98 | 4.86 | 10.25 | 14.37 | 91.04 | 94.56 |
| C2# | 4.79 | 6.56 | 23.67 | 13.73 | 90.64 | 85.33 |
| C3# | 3.19 | 5.01 | 12.32 | 12.58 | 90.35 | 93.08 |
| C4# | 3.18 | 5.12 | 12.24 | 12.63 | 89.56 | 92.98 |
| C5# | 3.51 | 5.13 | 12.19 | 12.77 | 90.18 | 92.09 |
| C6# | 5.65 | 6.73 | 18.31 | 18.91 | 89.65 | 84.43 |
| C7# | 5.52 | 8.45 | 17.69 | 17.88 | 85.71 | 86.03 |
| C8# | 3.45 | 5.62 | 10.78 | 14.68 | 90.82 | 93.35 |
| C9# | 5.46 | 8.33 | 20.06 | 19.94 | 85.92 | 87.78 |
| C10# | 3.24 | 4.56 | 12.79 | 12.87 | 90.49 | 91.56 |
| C11# | 3.79 | 4.28 | 12.65 | 12.33 | 80.26 | 82.82 |
| C12# | 3.04 | 5.16 | 11.37 | 13.62 | 90.67 | 93.79 |
| C13# | 5.35 | 7.64 | 12.58 | 12.19 | 89.74 | 92.35 |

FIG. 2

TABLE 3

| Battery No. | Capacity retention ratio after N cycles at 45 °C (%) | | | |
|---|---|---|---|---|
| | 50 | 100 | 200 | 300 |
| DC1# | 90.62 | 85.2 | 71.03 | 53.41 |
| DC2# | 91.91 | 86.98 | 75.62 | 65.67 |
| DC3# | 91.53 | 86.9 | 75.5 | 65.06 |
| DC4# | 92.03 | 87.11 | 76.92 | 68.69 |
| DC5# | 90.56 | 86.29 | 76.03 | 66.45 |
| C1# | 97.26 | 95.85 | 93.73 | 91.02 |
| C2# | 91.17 | 86.33 | 76.83 | 87.45 |
| C3# | 94.13 | 92.43 | 90.65 | 87.13 |
| C4# | 97.95 | 95.67 | 93.96 | 90.73 |
| C5# | 97.91 | 95.37 | 93.92 | 90.86 |
| C6# | 93.76 | 91.55 | 89.44 | 86.96 |
| C7# | 95.94 | 93.35 | 91.18 | 89.82 |
| C8# | 97.33 | 95.75 | 92.84 | 90.38 |
| C9# | 90.99 | 87.22 | 77.83 | 87.01 |
| C10# | 96.23 | 94.95 | 92.06 | 89.32 |
| C11# | 94.94 | 92.46 | 90.85 | 87.63 |
| C12# | 94.75 | 92.47 | 90.71 | 87.69 |
| C13# | 95.99 | 93.13 | 91.82 | 86.76 |

FIG. 3

TABLE 4

| Battery No. | Capacity retention ratio after N intermittent charging cycles at 50 °C (%) | | | |
|---|---|---|---|---|
| | 10 | 30 | 50 | 100 |
| DC1[#] | 88.5 | 76.15 | 65.99 | 49.62 |
| DC2[#] | 89.1 | 76.33 | 67.51 | 52.74 |
| DC3[#] | 89.3 | 76.46 | 68.55 | 52.33 |
| DC4[#] | 89.42 | 80.89 | 72.35 | 66.21 |
| DC5[#] | 90.23 | 83.16 | 76.19 | 70.05 |
| C1[#] | 98.02 | 92.63 | 90.48 | 86.69 |
| C2[#] | 91.37 | 81.48 | 77.69 | 71.73 |
| C3[#] | 95.72 | 86.43 | 80.64 | 76.44 |
| C4[#] | 96.93 | 91.54 | 89.7 | 84.39 |
| C5[#] | 96.8 | 91.97 | 89.21 | 84.42 |
| C6[#] | 91.71 | 80.13 | 76.36 | 70.25 |
| C7[#] | 92.47 | 82.26 | 79.34 | 74.29 |
| C8[#] | 97.15 | 90.87 | 88.56 | 83.68 |
| C9[#] | 92.05 | 82.98 | 77.07 | 71.79 |
| C10[#] | 96.64 | 91.53 | 89.3 | 84.41 |
| C11[#] | 94.63 | 89.49 | 83.46 | 74.25 |
| C12[#] | 97.94 | 91.37 | 89.69 | 85.73 |
| C13[#] | 97.88 | 90.28 | 88.72 | 84.35 |

FIG. 4

TABLE 5

| Battery No. | Battery conditions after the test |
|---|---|
| DC1# | All 5 batteries caught first |
| DC2# | All 5 batteries caught fire |
| DC3# | 3 batteries caught fire, and 2 batteries were intact |
| DC4# | 3 batteries caught fire, and 2 batteries were intact |
| DC5# | All 5 batteries were intact |
| C1# | All 5 batteries were intact |
| C2# | 3 batteries caught fire, and 2 batteries were intact |
| C3# | All 5 batteries were intact |
| C4# | All 5 batteries were intact |
| C5# | All 5 batteries were intact |
| C6# | 3 batteries caught fire, and 2 batteries were intact |
| C7# | 1 battery caught fire, and 4 batteries were intact |
| C8# | All 5 batteries were intact |
| C9# | All 5 batteries were intact |
| C10# | All 5 batteries were intact |
| C11# | All 5 batteries were intact |
| C12# | All 5 batteries were intact |
| C13# | All 5 batteries were intact |

FIG. 5

ELECTROLYTE SOLUTION AND LITHIUM ION BATTERY USING SAID ELECTROLYTE SOLUTION

CROSS-REFERENCE TO RELATED APPLICATION(S)

This application claims priority to Chinese Patent Application No. 201410788397, entitled "ELECTROLYTE SOLUTION AND LITHIUM ION BATTERY USING SAID ELECTROLYTE SOLUTION" and filed on Dec. 17, 2014, which is expressly incorporated by reference herein in its entirety.

BACKGROUND

Field

The present disclosure relates generally to batteries, and more particularly, to a non-aqueous electrolyte solution and a lithium-ion battery using said electrolyte solution.

Background

Lithium-ion batteries have prominent advantages such as having a high specific energy, a high specific power, a long cycle life, and a low self-discharge. Nowadays, lithium-ion batteries have been extensively used in electronic products, such as mobile communication devices, digital cameras, and camcorders, and have become a hot spot for energy storage and power development. Along with the extensive applications of lithium-ion batteries, there are now higher requirements regarding environment adaptability of the batteries. Lithium-ion batteries are used in various environments. In the adverse environment of a severely cold area, for example, it is required that lithium-ion batteries can function normally even at extremely low temperatures. However, the charge and discharge properties of lithium-ion batteries deteriorate significantly in a low temperature environment compared with those in a normal temperature environment.

As an important component of a lithium-ion battery, an electrolyte solution has a significant influence on the low temperature properties of the battery. There may be two ways to improve the low temperature properties of a lithium-ion battery from the perspective of the electrolyte solution. In the first way, the solvent composition is optimized to lower the viscosity of the electrolyte solution at a low temperature; the electrical conductivity is increased, for example, by adding a large quantity of a solvent with low viscosity, which can improve the low temperature properties of a lithium-ion battery. However, the high temperature properties of the battery may deteriorate. Thus, such a battery may be unable to ultimately solve the problems of the lithium-ion battery in applications. In the second way, the resistance of the anode solid electrolyte interface (SEI) membrane is lowered by optimizing additives to an electrolyte solution.

In light of this, there is indeed a need for developing of an electrolyte solution and a lithium-ion battery that increase the charging voltage upper limit and improve the high-temperature intermittent cyclability of the lithium-ion battery without affecting the high temperature properties thereof.

SUMMARY

In an aspect of the disclosure, an electrolyte solution for a lithium-ion battery and a lithium-ion battery using the electrolyte solution are provided. The electrolyte solution includes organic solvents, an electrolyte lithium salt, and additives. The additives include succinonitrile, fluorobenzene, and lithium tetrafluoroborate. The percentage by mass of the fluorobenzene in the electrolyte solution is 0.1%-15%. The percentage by mass of the succinonitrile in the electrolyte solution is 0.1%-10%. The percentage by mass of the lithium tetrafluoroborate in the electrolyte solution is 0.01%-1%. The electrolyte solution may increase the charging voltage upper limit and improve the high-temperature intermittent cyclability of the lithium-ion battery. At the same time, the electrolyte may lower the battery swelling rate, reduce the internal resistance, and improve the stability and safety of the lithium-ion battery.

BRIEF DESCRIPTION OF THE DRAWINGS

FIG. 1 is a Table 1 showing a corresponding relationship between labels and compositions of additives of electrolyte solutions.

FIG. 2 is a Table 2 showing high temperature storage performance test results of the batteries $C1^{\#}$-$C13^{\#}$ and $DC1^{\#}$-$DC5^{\#}$.

FIG. 3 is a Table 3 showing capacity retention ratio testing results after repeated charging and discharging at 45° C.

FIG. 4 is a Table 4 showing capacity retention ratios after intermittent charging cycles at 50° C.

FIG. 5 is a Table 5 showing results of overcharge performance tests on the lithium-ion batteries.

DETAILED DESCRIPTION

According to one aspect of the present application, an electrolyte solution for a lithium-ion battery is provided. The electrolyte solution is capable of forming stable passivation films on the surfaces of both the anode and the cathode of the lithium-ion battery. Utilizing the electrolyte solution on a lithium-ion battery may increase the charging voltage upper limit and may improve the high-temperature intermittent cyclability of the lithium-ion battery, while at the same time may lower the battery swelling rate, reduce the internal resistance, and improve stability and safety of the lithium-ion battery.

The electrolyte solution for a lithium-ion battery includes organic solvents, an electrolyte lithium salt, and additives. The additives includes succinonitrile (SN), fluorobenzene (FB), and lithium tetrafluoroborate ($LiBF_4$). In one example, the percentage by mass of the fluorobenzene in the electrolyte solution may be 0.1%-15%; the percentage by mass of the succinonitrile in the electrolyte solution may be 0.1%-10%; the percentage by mass of the lithium tetrafluoroborate in the electrolyte solution may be 0.01%-1%.

In one example, when the percentage by mass of fluorobenzene in the electrolyte solution is below 0.1%, fluorobenzene may not function as a high voltage additive. When the percentage by mass of fluorobenzene in the electrolyte solution is greater than 15%, fluorobenzene may cause the electrical conductivity of the electrolyte solution being reduced.

In one example, when the percentage by mass of succinonitrile in the electrolyte solution is below 0.1%, succinonitrile may not have a significant effect for inhibiting gas release at a high temperature and reducing reaction heat of the electrolyte solution in a cathode reaction. When the percentage by mass of succinonitrile in the electrolyte solution is greater than 10%, succinonitrile may cause the cyclability, the discharge rate, and the low temperature discharge performance of the battery core to deteriorate, as the viscosity of the electrolyte solution is overly increased.

In one example, when the percentage by mass of $LiBF_4$ in the electrolyte solution is below 0.01%, $LiBF_4$ may not significantly improve the discharge rate, the low temperature discharge performance, and the low temperature cyclability of a lithium-ion secondary battery. When the percentage by mass of $LiBF_4$ in the electrolyte solution is greater than 1%, $LiBF_4$ may have an overly strong effect on the anode, causing the kinetic reaction at the anode being slowed. Thus, the deteriorating effects of the $LiBF_4$ may overweigh the improving effects of the $LiBF_4$ on the anode. $LiBF_4$ may adversely affect the discharge rate, the low temperature discharge performance, and the low temperature cyclability of the lithium-ion secondary battery.

In one example, preferably, the additives include fluoroethylene carbonate.

In one example, preferably, the percentage by mass of the fluoroethylene carbonate in the electrolyte solution may be 0.1%-10%. Further preferably, the upper limit of the range of the percentage by mass of the fluoroethylene carbonate in the electrolyte solution may be selected from 10%, 8%, 7%, 6%, and 5%, and the lower limit of the range of the percentage by mass of the fluoroethylene carbonate in the electrolyte solution may be selected from 0.1%, 0.2%, 1%, 3%, and 4%. Further preferably, the percentage by mass of the fluoroethylene carbonate in the electrolyte solution may be 3%-7%.

In one example, preferably, the upper limit of the range of the percentage by mass of the fluorobenzene in the electrolyte solution may be selected 15%, 10%, and 7%, and the lower limit of the range of the percentage by mass of the fluorobenzene in the electrolyte solution may be selected from 0.1% and 3%. Further preferably, the percentage by mass of the fluorobenzene in the electrolyte solution may be 3%-7%.

In one example, preferably, the upper limit of the range of the percentage by mass of the succinonitrile in the electrolyte solution may be selected from 10% and 3%, and the lower limit of the range of the percentage by mass of the succinonitrile in the electrolyte solution may be selected from 0.1% and 0.5%. Further preferably, the percentage by mass of the succinonitrile in the electrolyte solution may be 0.5%-3%.

In one example, preferably, the percentage by mass of the lithium tetrafluoroborate in the electrolyte solution may be 0.01%-0.5%. Further preferably, the percentage by mass of the lithium tetrafluoroborate in the electrolyte solution may be 0.1%-0.3%.

In one example, the electrolyte lithium salt is selected from at least one of organic lithium salts or inorganic lithium salts. The electrolyte lithium salt does not contain lithium tetrafluoroborate.

In one example, preferably, the electrolyte lithium salt is selected from at least one of compounds containing fluorine or compounds containing lithium.

In one example, preferably, the electrolyte lithium salt is at least one selected from the group consisting of hexafluorophosphates, hexafluoroarsenates, lithium perchlorate, lithium trifluorosulfonate, lithium bis(trifluoromethylsulfonyl) imide, lithium bis(fluorolsulfonyl) imide, and lithium tris(trifluoromethylsulfonyl) methide.

In one example, preferably, the concentration of the electrolyte lithium salt may be 0.5 M-2 M. If the lithium salt concentration is too low, the electrical conductivity of the electrolyte solution will be low, affecting the discharge rate and the cyclability of the entire battery system. If the lithium salt concentration is too high, the viscosity of the electrolyte solution will be too high, similarly affecting the discharge rate of the entire battery system. Further preferably, the concentration of the electrolyte lithium salt may be 0.9-1.3 M.

In one example, preferably, the organic solvents are at least two selected from the group consisting of ethylene carbonates, propylene carbonates, dimethyl carbonates, diethyl carbonates, methylethyl carbonates, methyl formate, ethyl formate, ethyl propionate, propyl propionate, methyl butyrate, and tetrahydrofuran.

As a preferred embodiment, the electrolyte solution for a lithium-ion battery includes organic solvents, an electrolyte lithium salt, and additives.

As a preferred embodiment, the additives include fluorobenzene, succinonitrile, and lithium tetrafluoroborate.

As a preferred embodiment, the additives include fluorobenzene, succinonitrile, lithium tetrafluoroborate, and fluoroethylene carbonate.

According to another aspect of the present application, a lithium-ion battery is provided. The lithium-ion battery includes a cathode electrode, an anode electrode, a separator membrane, and an electrolyte solution. The electrolyte solution may be at least one of the electrolyte solutions described supra.

The lithium-ion battery includes a cathode current collector and a cathode film coated on the cathode current collector, an anode current collector and a cathode film coated on the anode current collector, a separator membrane, an electrolyte solution, and a packaging foil.

The cathode film includes a cathode active material, a binder, and a conductive agent.

The cathode film includes an anode active material, a binder, and a conductive agent.

The cathode active material is at least one selected from the group consisting of lithium cobalt oxide, LiNiMnCo ternary materials, lithium ferrite phosphonate, and lithium manganite. In one example, preferably, the cathode active material may be lithium cobalt oxide and/or a LiNiMnCo ternary material.

In one example, preferably, the anode active material may be graphite and/or silicon.

In one example, preferably, the anode active material may be a mixture of graphite and silicon, and the percentage by mass of silicon in the anode active material does not exceed 20%.

In one example, preferably, the charging voltage upper limit of the lithium-ion battery may be 4.5 V.

The present application may have the following advantageous effects:

(1) In the electrolyte solution provided by the present application, the additives may be capable of forming a film on the surface of the cathode, which may reduce the oxidation of the solvents and may improve the storage performance, the cyclability, and the intermittent cyclability of the battery at a high temperature and a high voltage.

(2) The charging voltage upper limit of the lithium-ion battery provided by the present application can reach up to 4.5 V, and the capacity retention ratio may be high during intermittent cycles at a high temperature.

(3) The lithium-ion battery provided by the present application may have a good storage performance at a high temperature. The swelling of the thickness and the increase of the internal resistance of the battery may be low. The remaining capacity and the recoverable capacity may be high.

(4) The lithium-ion battery provided by the present application may have a good cyclability at a high temperature, and the capacity retention ratio may be higher for both charge and discharge.

(5) The lithium-ion battery provided by the present application may improve safety, and does not catch fire or explode in the hot box test.

EMBODIMENTS

The present application will be further described infra with reference to embodiments. It should be understood that these embodiments are only used to illustrate the present application and does not limit the present application.

In the description infra, dimethyl carbonate may be abbreviated as DMC; ethylene carbonate may be abbreviated as EC; propylene carbonate may be abbreviated as PC; succinonitrile may be abbreviated as SN; fluorobenzene may be abbreviated as FB; and fluoroethylene carbonate may be abbreviated as FEC.

Embodiment 1

Preparation of the Electrolyte Solutions L1#-L13#

The steps for preparing the electrolyte solutions include the following: DMC, EC, and PC are mixed at a weight ratio of 1:1:1 to produce an organic solvent. The additives is added into the organic solvent. The additives and the organic solvent are homogenously mixed. $LiPF_6$ is added to the mixture to obtain a mixed solution with the $LiPF_6$ concentration at 1 mol/L, which is the electrolyte solution.

FIG. 1 is a Table 1 showing the corresponding relationship between the labels and the compositions of the additives of the electrolyte solutions.

Comparative Embodiment 1

Preparation of the Electrolyte Solutions DL1#-DL5#

The preparation steps are the same as those in Embodiment 1.

Table 1 also shows the corresponding relationship between the labels and the compositions of the additives of the electrolyte solutions obtained by changing the types and/or mixing ratios of the raw materials.

Embodiment 2

Preparation of the Batteries C1#-C13#, DC1#-DC5#

Preparation of Cathode Electrodes

Lithium cobalt oxide (with the molecular formula of $LiCoO_2$) as the cathode active material, acetylene black as the conductive agent, and polyvinylidene fluoride (PVDF) as the binder at a weight ratio of 96:2:2 are added into N-methylpyrrolidone (NMP) as the solvent, and are mixed and stirred thoroughly such that a homogeneous cathode slurry is formed. The slurry is coated on an aluminum (Al) foil as the cathode current collector. The coated cathode current collector is dried in an oven and cold pressed to produce the cathode electrodes.

Preparation of Anode Electrodes

Graphite as the anode active material, acetylene black as the conductive agent, styrene-butadiene rubber (SBR) as the binder, and sodium carboxymethylcellulose (CMC) as the thickening agent at a weight ratio of 95:2:2:1 are added into a proper amount of deionized water as the solvent, and are mixed and stirred thoroughly such that a homogeneous anode slurry is formed. The slurry is coated on a copper (Cu) foil as the anode current collector. The coated anode current collector is dried in an oven and cold pressed to produce the anode electrodes.

Preparation of Lithium-Ion Batteries

The PE porous polymer membrane is used as the separator membrane.

A cathode electrode, a separator membrane, and an anode electrode are stacked sequentially, such that the separator membrane is disposed between the cathode electrode and the anode electrode and separates the cathode electrode and the anode electrode. The stack is then rolled into a bare core. The bare core is placed into an external package. The electrolyte solutions L1#-L13# obtained in Embodiment 1 and the electrolyte solutions DL1#-DL5# obtained in the Comparative Embodiment 1 are injected into the dried batteries, respectively. After vacuum packaging, undisturbed standing, formation, and shaping, the preparation of the lithium-ion batteries is completed.

Lithium-ion batteries using the electrolyte solutions L1#-L13# obtained in Embodiment 1 are marked as Batteries C1#-C13#, respectively, and lithium-ion batteries using the electrolyte solutions DL1#-DL5# obtained in the Comparative Embodiment are marked as Batteries DC1#-DC5#, respectively.

Embodiment 3

High Temperature Storage Performance Tests of the Batteries C1#-C13#, DC1#-DC5#

The storage performance test at 60° C. is conducted on the batteries C1#-C13# and DC1#-DC5#. The specific operations of the high temperature storage test are as follows: the batteries C1#-C13# and DC1#-DC5# are charged to 4.5 V at a constant current of 0.5 C, respectively. The batteries are charged to the current of 0.025 C at the constant voltage of 4.5 V. The batteries are discharged to 3.0 V at a rate of 0.5 C. The discharge capacity is recorded as the discharge capacity of the batteries prior to storage. Subsequently, the batteries are charged to 4.5 V at a constant current of 0.5 C. Then the batteries are charged to the current of 0.025 C at the constant voltage of 4.5 V such that the batteries are in a fully charged state at 4.5 V. The thickness and internal resistance of the batteries prior to storage are measured. Then, the fully charged batteries are placed into a 60° C. thermostatic chamber. The batteries are taken out of the thermostatic chamber after 20 days and 35 days of storage, respectively. The thickness and internal resistance of the batteries are measured. The rate of thickness increase and the rate of internal resistance increase are calculated according to the following equations:

Rate of thickness increase (%)=(thickness after storage−thickness before storage)÷thickness before storage×100%

Rate of internal resistance (%)=(internal resistance after storage−internal resistance before storage)÷internal resistance before storage×100%

The batteries are cooled to room temperature, and then discharged to 3.0 V at a rate of 0.5 C. The discharge capacity is the residual capacity of the batteries after storage. Subsequently, the batteries are charged to 4.5 V at a constant current of 0.5 C. The batteries are charged to the current of 0.025 C at the constant voltage of 4.5 V. Then the batteries are discharged to 3.0 V at a rate of 0.5 C. The discharge capacity is the reversible discharge capacity of the batteries after storage. Substituting the discharge capacity prior to storage, the residual capacity, and the reversible discharge capacity after storage of the batteries into the following equations, the capacity retention ratio and the capacity recovery ratio of the batteries after high temperature storage can be calculated.

Capacity retention ratio (%)=residual capacity after storage (mAh)÷discharge capacity prior to storage (mAh)×100%

Capacity recovery ratio (%)=reversible discharge capacity after storage (mAh)÷discharge capacity prior to storage (mAh)×100%

FIG. 2 is a Table 2 showing high temperature storage performance test results of the batteries $C1^\#$-$C13^\#$, $DC1^\#$-$DC5^\#$. It can be seen from the data in Table 2 that, compared with the batteries $DC1^\#$-$DC5^\#$ that use the electrolyte solutions in the Comparative Embodiment 1, the batteries $C1^\#$-$C13^\#$ that use the electrolyte solutions in the Embodiment 1 have better storage performance. As the amounts of the additives in the electrolyte solutions vary, the storage performance of the batteries $C1^\#$-$C13^\#$ changes as well. The electrolyte solution of $DC1^\#$ only uses FEC as an additive, and the storage performance, the cyclability, and the safety performance of the electrolyte solution of $DC1^\#$ are relatively poor. The electrolyte solution of $DC2^\#$ uses a combination of FEC and $LiBF_4$. The cyclability and the storage performance of the electrolyte solution of $DC2^\#$ are slightly improved, but the safety performance of the electrolyte solution of $DC2^\#$ is still relatively poor. The electrolyte solution of $DC3^\#$ uses a combination of FEC, SN, and $LiBF_4$. The storage performance and safety performance of the electrolyte solution of $DC3^\#$ are slightly improved, but the cyclability of the electrolyte solution of $DC3^\#$ is not improved. The electrolyte solution of $DC4^\#$ uses a combination of FEC, FB, and $LiBF_4$. The storage performance and cyclability of the electrolyte solution of $DC4^\#$ are improved, but may not meet the requirements. The electrolyte solution of $DC5^\#$ uses a combination of FEC, FB, and SN. The storage performance of the electrolyte solution of $DC5^\#$ is improved to a relatively great degree. The safety performance of the electrolyte solution of $DC5^\#$ is also improved. But the cyclability of the electrolyte solution of $DC5^\#$ is still relatively poor.

Embodiment 4

Cyclability Tests of the Batteries $C1^\#$-$C13^\#$, $DC1^\#$-$DC5^\#$ at 45° C.

The cyclability test is conducted on the batteries $C1^\#$-$C13^\#$ and $DC1^\#$-$DC5^\#$. The batteries are charged to 4.5 V at 45° C. and a constant current of 0.5 C. The batteries are charged to a current of 0.05 C at a constant voltage of 4.5 V. Let the batteries stand for 5 minutes after being fully charged. The batteries are discharged to 3.0 V at a rate of 0.5 C. Let the batteries stand for 30 minutes. The batteries are charged to 4.5 V at a constant current of 0.5 C. The batteries are charged to a current of 0.05 C at a constant voltage of 4.5 V. Let the batteries stand for 5 minutes. The batteries are discharged to 3.0 V at a rate of 0.5 C. Let the batteries stand for 5 minutes. The batteries are repeatedly charged and discharged according to the same conditions. The discharge capacity for different cycle numbers are recorded, and the capacity retention ratio is calculated using the equation below:

Cycle capacity retention ratio=discharge capacity for different cycle numbers/initial discharge capacity×100%.

FIG. 3 is a Table 3 showing capacity retention ratio testing results after repeated charging and discharging at 45° C. It can be seen from the testing results that, compared with the batteries $DC1^\#$-$DC5^\#$ that use the electrolyte solutions in the Comparative Embodiment 1, the batteries $C1^\#$-$C13^\#$ that use the electrolyte solutions according to the Embodiment 1 have a cyclability, in particular a long-term cyclability, that is significantly improved.

Embodiment 5

Intermittent Charging Tests of the Batteries $C1^\#$-$C13^\#$, $DC1^\#$-$DC5^\#$ The intermittent charging test is conducted on the batteries $C1^\#$-$C13^\#$ and $DC1^\#$-$DC5^\#$. At 50° C., four of each of the batteries $C1^\#$-$C13^\#$ and $DC1^\#$-$DC5^\#$ are charged to 4.5 V at a constant current of 0.5 C. At a constant voltage of 4.5 V, the batteries are charged to a current of 0.05 C. Let the batteries stand for 20 hours after being full charged. The batteries are discharged to 3.0 V at a rate of 0.5 C. Let the batteries stand for 20 hours. The batteries are charged to 4.5 V at a constant current of 0.5 C. The batteries are charged at a constant voltage to 0.05 C. Let the batteries stand for 20 hours. The batteries are discharged to 3.0 V at a rate of 0.5 C. Let the batteries stand for 5 minutes. The batteries are repeatedly charged and discharged according to the same conditions. The discharge capacities for different cycle numbers are recorded. The capacity retention ratios are calculated. The results are listed in a Table 4.

FIG. 4 is a Table 4 showing capacity retention ratios after intermittent charging cycles at 50° C. It can be seen from the data in the Table 4 that for the batteries $C1^\#$-$C13^\#$ that contain succinonitrile, fluorobenzene, and lithium tetrafluoroborate together in the electrolyte solutions, the capacity retention ratios after multiple intermittent cycles at high temperature are generally higher than the capacity retention ratios of the batteries $DC1^\#$-$DC5^\#$ that do not contain succinonitrile, fluorobenzene, and lithium tetrafluoroborate together in the electrolyte solutions. As the cycle number increases, moreover, the decrease rates of the capacity retention ratios of the batteries $DC1^\#$-$DC5^\#$ are far greater than the decrease rates of the capacity retention ratios of the batteries $C1^\#$-$C13^\#$.

Embodiment 6

Hot Box Tests of the Batteries $C1^\#$-$C13^\#$, $DC1^\#$-$DC5^\#$

The hot box test is conducted on the batteries $C1^\#$-$C13^\#$ and $DC1^\#$-$DC5^\#$. At 25° C., five of each of the batteries $C1^\#$-$C13^\#$ and $DC1^\#$-$DC5^\#$ are charged to 4.5 V at a constant current of 0.5 C, and then are charged at a constant voltage to a current of 0.05 C. The batteries are subsequently placed into a hot box. The temperature of the hot box is increased from a normal temperature at 5° C./minute to 150° C. The temperature of the hot box is kept constant at 150° C. for 30 minutes. The battery conditions after the test are observed.

FIG. 5 is a Table 5 showing results of overcharge performance tests on the lithium-ion batteries. It can be seen from the above testing results that, compared with the batteries DC1#-DC5# that use the electrolyte solutions in the Comparative Embodiment 1, the batteries C1#-C13# that use the electrolyte solutions according to the Embodiment 1 have a cyclability and a storage performance that are significantly improved. The operating voltage of the lithium-ion batteries can be increased to 4.5 V, and the energy density can be increased. At the same time, the thermal abuse performance of the electrolyte solutions can be significantly improved, thereby improving the safety and reliability of the batteries.

According to the disclosure of the above Specification, those skilled in the art may further make appropriate variations and modifications to the above embodiments. Therefore, the present application is not limited by the specific embodiments disclosed and described above. Some variations and modifications to the present application shall also be encompassed by the claims of the present application.

What is claimed is:

1. An electrolyte solution for a lithium-ion battery, comprising:
    an organic solvent;
    an electrolyte lithium salt; and
    an additive including succinonitrile, fluorobenzene, and lithium tetrafluoroborate, wherein a percentage by mass of the fluorobenzene in the electrolyte solution is in a range of 0.1% to 15%, wherein a percentage by mass of the succinonitrile in the electrolyte solution is in a range of 0.1% to 10%, and wherein a percentage by mass of the lithium tetrafluoroborate in the electrolyte solution is in a range of 0.01% to 1%.

2. The electrolyte solution according to claim 1, wherein the additive further comprises fluoroethylene carbonate, and wherein a percentage by mass of fluoroethylene carbonate in the electrolyte solution is in a range of 0.1% to 10%.

3. The electrolyte solution according to claim 1, wherein the additive further comprises fluoroethylene carbonate, and wherein a percentage by mass of fluoroethylene carbonate in the electrolyte solution is in a range of 3% to 7%.

4. The electrolyte solution according to claim 1, wherein the percentage by mass of fluorobenzene in the electrolyte solution is in a range of 3% to 7%.

5. The electrolyte solution according to claim 1, wherein the percentage by mass of the succinonitrile in the electrolyte solution is in a range of 0.5% to 3%.

6. The electrolyte solution according to claim 1, where the percentage by mass of the lithium tetrafluoroborate in the electrolyte solution is in a range of 0.1% to 0.3%.

7. The electrolyte solution according to claim 1, wherein the electrolyte lithium salt is at least one selected from the group consisting of hexafluorophosphates, hexafluoroarsenates, lithium perchlorate, lithium trifluorosulfonate, lithium bis(trifluoromethylsulfonyl) imide, lithium bis(fluorolsulfonyl) imide, and lithium tris(trifluoromethylsulfonyl) methide.

8. The electrolyte solution according to claim 1, wherein the organic solvent is at least two selected from the group consisting of ethylene carbonates, propylene carbonates, dimethyl carbonates, diethyl carbonates, methylethyl carbonates, methyl formate, ethyl formate, ethyl propionate, propyl propionate, methyl butyrate, and tetrahydrofuran.

9. A lithium-ion battery, comprising:
    a cathode electrode;
    an anode electrode;
    a separator membrane; and
    an electrolyte solution comprising:
        an organic solvent;
        an electrolyte lithium salt; and
        an additive including succinonitrile, fluorobenzene, and lithium tetrafluoroborate, wherein a percentage by mass of the fluorobenzene in the electrolyte solution is in a range of 0.1% to 15%, wherein a percentage by mass of the succinonitrile in the electrolyte solution is in a range of 0.1% to 10%, and wherein a percentage by mass of the lithium tetrafluoroborate in the electrolyte solution is in a range of 0.01% to 1%.

10. The lithium-ion battery according to claim 9, wherein a charging voltage upper limit of the lithium-ion battery is 4.5 V.

* * * * *